(12) United States Patent
Merry et al.

(10) Patent No.: US 10,995,454 B2
(45) Date of Patent: May 4, 2021

(54) USING RECYCLED WASTE WATER TO MAKE NONWOVEN FIBROUS MATERIALS SUITABLE FOR USE IN A POLLUTION CONTROL DEVICE OR IN A FIRESTOP

(71) Applicant: 3M INNOVATIVE PROPERTIES COMPANY, St. Paul, MN (US)

(72) Inventors: Richard P. Merry, Chisago City, MN (US); Ian R. I. Harding, Mahtomedi, MN (US); Gary F. Howorth, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 311 days.

(21) Appl. No.: 15/102,393

(22) PCT Filed: Dec. 12, 2014

(86) PCT No.: PCT/US2014/069977
§ 371 (c)(1),
(2) Date: Jun. 7, 2016

(87) PCT Pub. No.: WO2015/094957
PCT Pub. Date: Jun. 25, 2015

(65) Prior Publication Data
US 2016/0305071 A1   Oct. 20, 2016

Related U.S. Application Data

(60) Provisional application No. 61/918,355, filed on Dec. 19, 2013.

(51) Int. Cl.
*D21H 13/38*       (2006.01)
*F01N 3/28*        (2006.01)
(Continued)

(52) U.S. Cl.
CPC ............. *D21H 13/38* (2013.01); *D21H 13/36* (2013.01); *D21H 17/36* (2013.01); *D21H 21/10* (2013.01);
(Continued)

(58) Field of Classification Search
CPC ........ D21H 13/36; D21H 27/00; D21H 13/38; D21H 17/36; D21H 21/10; D21H 21/18;
(Continued)

(56) References Cited

U.S. PATENT DOCUMENTS 2,771,823 A * 11/1956 Lukemire ................. D21F 1/66
                                                        162/190
3,001,571 A    9/1961 Hatch
(Continued)

FOREIGN PATENT DOCUMENTS

CA        703769      2/1965
CA        725550      1/1966
(Continued)

OTHER PUBLICATIONS

Au et al., "Applications of Wet-End Paper Chemistry," Blackie Academic & Professional, first edition, pp. 13-26 (Year: 1995).*
(Continued)

*Primary Examiner* — Jose A Fortuna
(74) *Attorney, Agent, or Firm* — Harold C. Knecht, III

(57) ABSTRACT

A method of making nonwoven fibrous materials suitable for use in a pollution control device or as a firestop, where the method comprises: providing a first slurry comprising water, first inorganic fibers, a first organic binder, and a first neutral pH flocculent; removing first waste water from the first slurry; optionally forming a first nonwoven fibrous material from the first slurry; providing a second slurry comprising a quantity of the first waste water, an optional quantity of relatively clean water, second inorganic fibers, a second
(Continued)

organic binder, and a second flocculent that is the same and/or a different flocculent than that used in the first slurry; and forming a second nonwoven fibrous material from the second slurry. The addition of the first waste water in the second slurry does not adversely affect the flocculation of the second organic binder in the second slurry.

17 Claims, 1 Drawing Sheet

(51) Int. Cl.
    *D21H 21/18*    (2006.01)
    *D21H 13/36*    (2006.01)
    *F01N 13/18*    (2010.01)
    *D21H 21/10*    (2006.01)
    *D21H 17/36*    (2006.01)
    *F16L 59/02*    (2006.01)
    *F16L 59/14*    (2006.01)

(52) U.S. Cl.
    CPC ............ *D21H 21/18* (2013.01); *F01N 3/2853* (2013.01); *F01N 13/18* (2013.01); *F16L 59/026* (2013.01); *F16L 59/145* (2013.01)

(58) Field of Classification Search
    CPC .......... D21F 1/66; F01N 3/2853; F01N 13/18; C02F 2103/28; Y10S 210/928; Y10T 29/49398
    See application file for complete search history.

(56) References Cited

U.S. PATENT DOCUMENTS

| | | |
|---|---|---|
| 3,069,744 A | 12/1962 | Emery |
| 3,229,016 A | 1/1966 | Emery |
| 3,458,329 A | 7/1969 | Owens |
| 3,575,853 A * | 4/1971 | Gaughan et al. ........ C02F 1/705 210/195.3 |
| 3,661,707 A | 5/1972 | Emery et al. |
| 3,916,057 A | 10/1975 | Hatch et al. |
| 4,115,188 A * | 9/1978 | O'Brien .................. D21F 1/82 162/190 |
| 4,121,966 A * | 10/1978 | Amano .................. D21H 17/34 162/164.1 |
| 4,156,533 A | 5/1979 | Close et al. |
| 4,221,634 A * | 9/1980 | Frost, III .................. C02F 9/00 162/190 |
| RE31,507 E * | 1/1984 | Frost, III .................. D21F 1/66 162/190 |
| 4,433,020 A | 2/1984 | Narukawa et al. |
| 4,521,333 A | 6/1985 | Graham et al. |
| 4,525,278 A * | 6/1985 | Frost, III .................. D21F 1/66 162/190 |
| 4,625,908 A | 12/1986 | Emery |
| 4,737,238 A * | 4/1988 | de Ruvo .................. D21C 5/02 162/181.2 |
| 4,782,995 A | 11/1988 | Emery et al. |
| 5,002,633 A * | 3/1991 | Maxham .................. D21B 1/32 162/189 |
| 5,008,086 A | 4/1991 | Merry |
| 5,078,822 A | 1/1992 | Hodges et al. |
| 5,174,863 A | 12/1992 | Emery |
| 5,379,946 A | 1/1995 | Emery |
| 5,417,809 A * | 5/1995 | Hoffman .................. D21F 1/48 162/189 |
| 5,449,437 A * | 9/1995 | Vikio .................. B01D 36/02 162/189 |
| 5,567,278 A * | 10/1996 | Meinander .............. D21F 1/66 162/189 |
| 5,686,039 A | 11/1997 | Merry |
| 5,714,421 A | 2/1998 | Olds et al. |
| 5,800,875 A | 9/1998 | Hussong |
| 5,833,805 A | 11/1998 | Emery |
| 5,882,608 A | 3/1999 | Sanocki et al. |
| 5,942,086 A | 8/1999 | Owen |
| 6,051,193 A * | 4/2000 | Langer .................... B01D 53/88 422/179 |
| 6,071,380 A * | 6/2000 | Hoffman .................. D21B 1/32 159/47.3 |
| 6,224,835 B1* | 5/2001 | Langer .................... B01D 53/88 422/179 |
| 6,372,139 B1* | 4/2002 | Habets ...................... C02F 9/00 162/29 |
| 6,514,379 B1* | 2/2003 | Gartz .................. D21C 11/0021 162/189 |
| 6,589,488 B1 | 7/2003 | Eyhorn |
| 6,596,120 B2 | 7/2003 | Davis et al. |
| 6,726,884 B1 | 4/2004 | Dillon et al. |
| 7,306,773 B2 | 12/2007 | Tanaka et al. |
| 7,959,867 B2 | 6/2011 | Kariya et al. |
| 8,124,022 B2* | 2/2012 | Howorth ............... A61M 5/007 422/179 |
| 8,157,963 B2 | 4/2012 | Kariya et al. |
| 8,163,136 B2* | 4/2012 | Cabrera y Lopez Caram ............ D21F 1/009 162/208 |
| 8,273,214 B2 | 9/2012 | Droux et al. |
| 8,632,727 B2* | 1/2014 | Shirk .................. B01D 53/9454 422/179 |
| 8,715,466 B1* | 5/2014 | Caouette .............. D21G 9/0018 162/190 |
| 8,741,200 B2* | 6/2014 | Shirk .................. B01D 53/9454 264/320 |
| 8,747,618 B2* | 6/2014 | Cabrera y Lopez Caram ............ D21F 1/48 162/202 |
| 2001/0046456 A1* | 11/2001 | Langer .................... B01D 53/88 422/179 |
| 2002/0025904 A1 | 2/2002 | Goto et al. |
| 2003/0185724 A1 | 10/2003 | Anji et al. |
| 2003/0185725 A1 | 10/2003 | Mutou et al. |
| 2004/0137175 A1* | 7/2004 | Dillon .................. F01N 3/0211 428/34.4 |
| 2005/0232827 A1* | 10/2005 | Merry ...................... B32B 7/02 422/179 |
| 2006/0070554 A1 | 4/2006 | Braunreiter et al. |
| 2006/0154040 A1 | 7/2006 | Merry |
| 2007/0065349 A1* | 3/2007 | Merry .................... C03C 3/083 422/179 |
| 2008/0178566 A1 | 7/2008 | Okabe |
| 2008/0292879 A1* | 11/2008 | Kumamoto ............... A61F 7/03 428/339 |
| 2009/0041638 A1 | 2/2009 | Tomosue et al. |
| 2010/0115900 A1* | 5/2010 | De Rovere ........ B01D 39/2024 55/524 |
| 2010/0143212 A1 | 6/2010 | Sakane et al. |
| 2010/0247399 A1* | 9/2010 | Shirk .................. B01D 53/9454 422/179 |
| 2012/0135205 A1* | 5/2012 | Merry .................... B23K 26/40 428/193 |
| 2012/0171457 A1* | 7/2012 | De Rovere ........ B01D 39/2024 428/292.1 |
| 2016/0305071 A1* | 10/2016 | Merry .................... D21H 13/36 |

FOREIGN PATENT DOCUMENTS

| | | | |
|---|---|---|---|
| CA | 754998 | 3/1967 | |
| CA | 1307969 | 9/1992 | |
| CA | 1310161 | 11/1992 | |
| CA | 2177669 | 5/1996 | |
| DE | 102006036018 B3 * | 1/2008 | ............... D21D 5/00 |
| EP | 639700 | 2/1995 | |
| EP | 639701 | 2/1995 | |
| EP | 639702 | 2/1995 | |
| EP | 1182333 | 2/2002 | |
| EP | 1884592 A1 * | 2/2008 | ............... D21D 5/00 |
| GB | 1073877 | 6/1967 | |
| JP | 2311344 | 12/1990 | |
| JP | 06025993 | 2/1994 | |

(56) References Cited

FOREIGN PATENT DOCUMENTS

| | | | | |
|---|---|---|---|---|
| JP | 2011123386 | 5/2001 | | |
| JP | 2002147228 | 5/2002 | | |
| JP | 3746007 | 8/2003 | | |
| JP | 2003238264 | 8/2003 | | |
| JP | 3980919 | 10/2003 | | |
| JP | 2003293759 | 10/2003 | | |
| JP | 2004124720 | 4/2004 | | |
| JP | 2007197264 | 8/2007 | | |
| JP | 2011235253 | 11/2011 | | |
| WO | WO 00/075496 | 12/2000 | | |
| WO | WO-2004061279 A1 * | 7/2004 | ............ | B01D 53/88 |
| WO | WO-2005064076 A1 * | 7/2005 | ............ | D21C 3/22 |
| WO | WO-2005064077 A1 * | 7/2005 | ............ | D21C 9/147 |
| WO | WO 2006/020058 | 2/2006 | | |
| WO | WO 2008/103525 | 8/2008 | | |
| WO | WO 2010/077360 | 7/2010 | | |
| WO | WO 2011/006023 | 1/2011 | | |
| WO | WO 2011/019377 | 2/2011 | | |

OTHER PUBLICATIONS

International Search Report for PCT International Application No. PCT/US2014/069977, dated Apr. 20, 2015, 4 pgs.

* cited by examiner

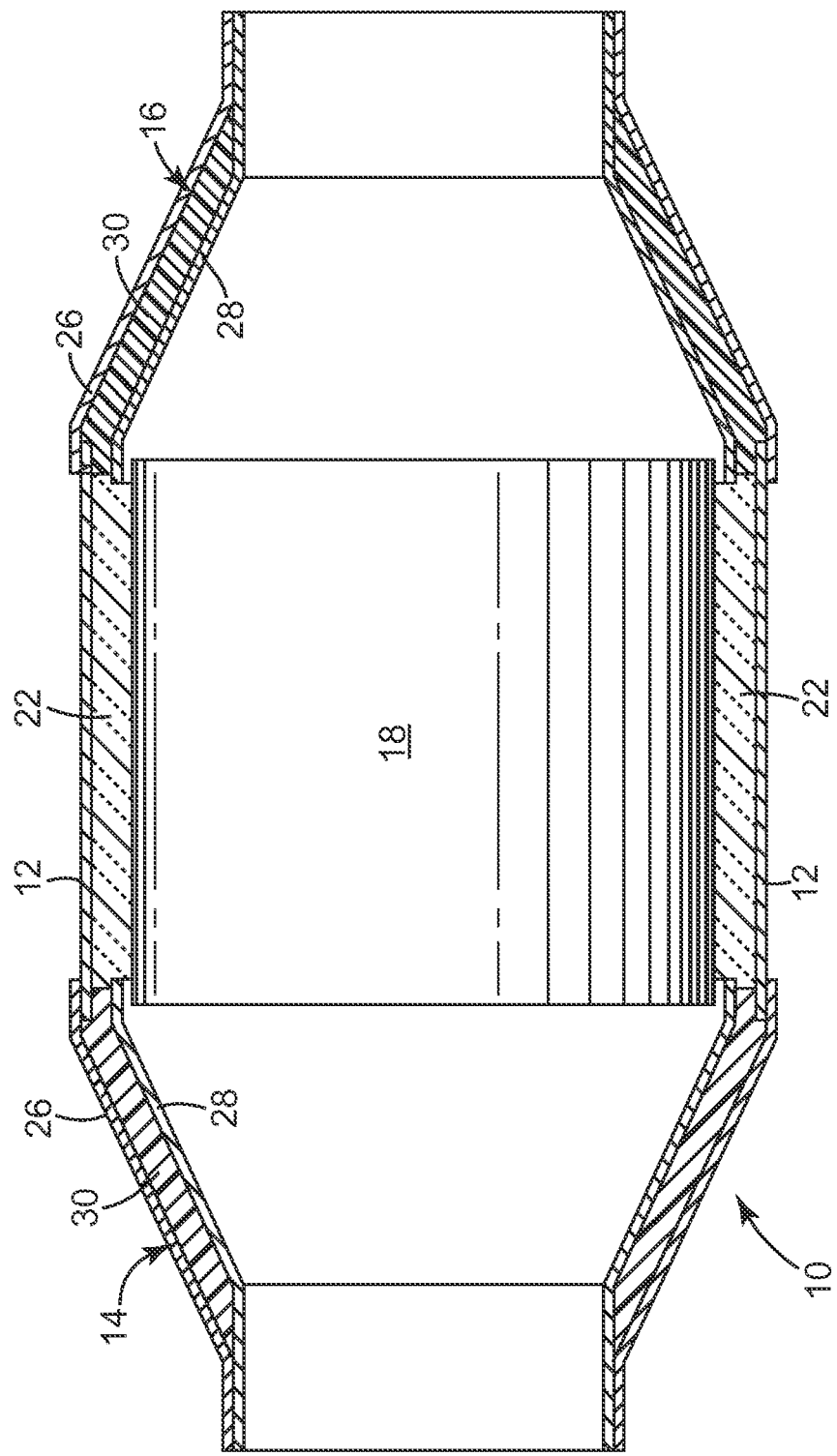

USING RECYCLED WASTE WATER TO MAKE NONWOVEN FIBROUS MATERIALS SUITABLE FOR USE IN A POLLUTION CONTROL DEVICE OR IN A FIRESTOP

CROSS REFERENCE TO RELATED APPLICATIONS

This application is a national stage filing under 35 U.S.C. 371 of PCT/US2014/069977, filed Dec. 12, 2014, which claims the benefit of U.S. Provisional Application No. 61/918,355, filed Dec. 19, 2013, the disclosures of which are incorporated by reference in their entireties herein.

The present invention relates to the making of nonwoven fibrous materials with inorganic fibers (for use e.g., in pollution control devices, in fire stop applications, etc.) using an aqueous slurry, in particular, to such a process that includes recycling of at least some of the waste water from an earlier used slurry, and more particularly, to such a process for making nonwoven fibrous materials, e.g., such as those useful in pollution control devices (e.g., mounting mats and thermal insulation) and in fire stop applications (e.g., in the form of blankets, wraps, and tapes), along with the nonwoven fibrous materials made thereby.

BACKGROUND

Aqueous slurries containing inorganic fibers have been used in the past to make a variety of nonwoven fibrous materials for use in a wide range of applications. Processes for making nonwoven fibrous materials using such aqueous slurries have included, for example, wet laid paper making techniques, like that disclosed in U.S. Pat. No. 6,224,835, and vacuum molding processes, like that disclosed in U.S. Pat. No. 5,800,875.

In a typical wet laid paper making process, such an aqueous slurry is poured onto one side of a screen or porous web and waste water is removed (e.g., by the force of gravity, the application of a vacuum, or both) on the other side of the screen, thereby leaving a wet nonwoven fibrous material on the one side of the screen or porous web. The resulting wet nonwoven fibrous material is subsequently dried (e.g., by air drying, baking or both) to form a continuous web or sheet-like nonwoven fibrous material, which may be further processed or converted (e.g., by die or laser cutting) into a desired shape (e.g., a mat, a strip, 2-dimensional end cone shape, etc.).

In a typical vacuum molding process, a mold die formed with a screen or otherwise perforated surface is submerged into such an aqueous slurry and waste water is sucked out of the mold die through the perforations, thereby leaving a wet nonwoven fibrous material on the perforated surface of the mold die. The resulting wet molded fibrous material is then removed from the mold and dried (e.g., by air drying, baking or both) to form a nonwoven fibrous material having a shape corresponding to the mold die (e.g., a truncated cone shape for an end cone insulator).

In the prior art processes that use such an aqueous slurry to make a nonwoven fibrous material, the waste water is discarded. Because of environmental concerns, such waste water is necessarily subjected to a water treatment process, before it is discarded. The degree of treatment for such waste water can vary from jurisdiction to jurisdiction, especially from country to country. In the U.S., the pH level of such treated waste water is typically required to be in the range of from about 5 up to and including 9 or even 11, before the waste water is allowed to be transferred into public water systems (e.g., a city sewer system).

Such nonwoven fibrous materials have been made into exemplary articles such as mounting mats and thermal insulation for use in pollution control devices (e.g., catalytic converters, diesel particulate filters, and diesel traps), and as blankets, wraps, and tapes for use in fire stop applications There is a continuing need for improvements to such processes. The present invention is directed to providing such an improvement.

SUMMARY OF THE INVENTION

In one aspect of the present invention, a method is provided for making nonwoven fibrous materials suitable for use in a pollution control device or as a firestop. The method comprises: providing a first slurry comprising water, first inorganic fibers, a first organic binder, and a first neutral pH flocculent; removing first waste water from the first slurry; optionally forming a first nonwoven fibrous material from the first slurry; providing a second slurry comprising a quantity of the first waste water, an optional quantity of relatively clean water, second inorganic fibers, a second organic binder, and a second flocculent that is the same and/or a different flocculent than that used in the first slurry; and forming a second nonwoven fibrous material from the second slurry. The addition of the first waste water in the second slurry does not adversely affect the flocculation of the second organic binder in the second slurry. The present invention also provides a nonwoven fibrous material made according to such a method.

In an additional aspect of the present invention, a nonwoven fibrous material is provided that exhibits a pH in the range of from about 5.5 up to and including about 8.5, when tested according to the Material pH Test described herein.

In a further aspect of the present invention, a pollution control device is provided that comprises a housing, a pollution control element disposed within the housing; and a nonwoven fibrous material, according to the present invention, disposed within the housing.

In another aspect of the present invention, a firestop is provided that comprise a nonwoven fibrous material, according to the present invention.

In an additional aspect of the present invention, a slurry is provided for making nonwoven fibrous materials. The slurry comprises a quantity of a first waste water removed from a first slurry comprising water, first inorganic fibers, a first organic binder, and a first neutral pH flocculent. The slurry includes second inorganic fibers; a second organic binder; and an optional second neutral pH flocculent. The slurry may also include an optional quantity of relatively clean water. The first neutral pH flocculent causes the first waste water to maintain a relatively neutral pH. The present invention also provides a nonwoven fibrous material formed using a slurry according to the present invention.

These and other aspects, features and/or advantages of the invention are further shown and described in the drawing and detailed description herein, where like reference numerals are used to represent similar parts. It is to be understood, however, that the drawing and description are for illustration purposes only and should not be read in a manner that would unduly limit the scope of this invention.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

In the accompanying drawing:

FIG. 1 is a cross-sectional view of an exemplary pollution control device using different embodiments of nonwoven fibrous material in accordance with the present invention.

DETAILED DESCRIPTION OF CERTAIN EMBODIMENTS

In describing preferred embodiments of the invention, specific terminology is used for the sake of clarity. The invention, however, is not intended to be limited to the specific terms so selected, and each term so selected includes all technical equivalents that operate similarly.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, and the term "or" is generally employed in its sense including "and/or", unless the content clearly dictates otherwise. As used herein, "a," "an," "the," "at least one," and "one or more" are used interchangeably. The term "and/or" means one or all of the listed elements or a combination of any two or more of the listed elements.

The term "polymer" will be understood to include polymers, copolymers (e.g., polymers formed using two or more different monomers), oligomers and combinations thereof, as well as polymers, oligomers, or copolymers that can be formed in a miscible blend.

The terms "comprises" and variations thereof do not have a limiting meaning where these terms appear in the description and claims.

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

In one exemplary method of making a nonwoven fibrous material according to the present invention, an initial slurry according to the present invention can be produced by first filling a container with a quantity of water (e.g., residential or commercial tap water) suitable for use in making the slurry. The slurry typically contains greater than about 65%, 70%, 75%, 80%, 85%, 90% or 95% by weight water. The water is then agitated (e.g., by a blending action), and while the water is being agitated, a quantity of inorganic fibers and organic binder is added to the agitated water. A neutral pH flocculent is then added to the agitated water in order to precipitate the organic binder onto the inorganic fibers and other optional solid ingredients of the slurry. The meaning of a neutral pH flocculent is described in detail later. The organic binder can be in the form of a liquid dispersion or suspension of organic binder droplets, particles or both. It may be desirable to include optional ingredients in the water. Such optional ingredients added to the slurry may include, for example, a quantity of any one or any combination of a flocculent that is not a neutral pH flocculent, defoaming agent, organic fibers, inorganic particles (e.g., intumescent particles, colloidal silica particles, abrasive particles, friction inducing particles, etc.), fillers, and other conventional additives. The agitation of the resulting mixture tends to cause a uniform distribution or homogeneity of the components throughout the slurry.

Useful inorganic fibers can include for example, glass fibers, ceramic fibers, non-oxide inorganic fibers, such as graphite fibers or boron fibers, and mixtures thereof.

Useful ceramic fibers can include, for example, aluminoborosilicate fibers, aluminosilicate fibers, alumina fibers, heat-treated versions thereof, and mixtures thereof. Examples of suitable aluminoborosilicate fibers include those commercially available under the trade designations "NEXTEL 312 CERAMIC FIBERS", "NEXTEL 440 CERAMIC FIBERS", and "NEXTEL 550 CERAMIC FIBERS" from 3M Company, St. Paul, Minn. Examples of suitable aluminosilicate fibers include those available under the trade designations "FIBERFRAX" 7000M from Unifrax Corp., Niagara Falls, N.Y., "CERAFIBER" from Thermal Ceramics, Augusta, Ga.; and "SNSC Type 1260 Dl" from Nippon Steel Chemical Company, Tokyo, Japan. Examples of suitable commercially available alumina fibers include polycrystalline alumina fibers available from Saffil, Widnes, England under the trade designation "SAFFIL".

Examples of other suitable inorganic fibers can include: quartz fibers, amorphous and crystalline fibers of high silica content, alumina fibers and high alumina fibers, amorphous and crystalline alumina-silica fibers, oxide and non-oxide fibers, metallic fibers, fibers formed by blowing, spinning and pulling from a melt, sol-gel formed inorganic fibers, fibers formed from organic precursors, glass fibers, leached glass fibers, low bio-persistent (a.k.a., bio-soluble) fibers like those taught by U.S. Pat. No. 5,714,421, and other fibers of a substantially inorganic composition. It may be desirable for each such inorganic fiber to have some, most or all of its surface coated or sized with an organic and/or inorganic material. Suitable inorganic fibers may be used alone or in combination with other suitable inorganic fibers.

Generally speaking, inorganic fibers containing a substantial amount of shot are less expensive than shot-free, or partially cleaned inorganic fibers. However, shot-free inorganic fibers generally provide more resilient articles (e.g., webs, sheets, mats). Mounting mats made with such shot-free inorganic fibers can maintain better holding forces at all temperatures including a return to room temperature. Accordingly, it may be desirable for inorganic fibrous material according to the present invention to contain less than 75, 70, 65, 60, 55, 50, 45, 40, 35, 30, 25, 20, 15 or even less than 10 percent by weight, or less, of shot based on the total dry weight of the inorganic fibrous material.

Useful organic binders may include, for example, those comprising one or more or any combination of acrylic polymers, vinyl polymers (for example, copolymers of monomers comprising ethylene and vinyl acetate), polyurethanes, and silicone polymers having anionic groups (for example, end groups and/or pendant side chain groups). The organic binders may be in the form of an aqueous anionically stabilized polymer emulsion (for example, a latex), although solvent-based polymer binders, or 100 percent solids polymer binders may be useful in some cases. The organic binder polymer may have a glass transition temperature of less than 30° C., 0° C., −10° C., −20° C., −30° C., or even less than −40° C., but this is not a requirement. The organic binder polymer may comprise an elastomer. Useful organic binders in the form of aqueous polymer emulsions (including latex emulsions) may include, for example, any one of or any combination of acrylic polymer emulsions, polyurethane emulsions, silicone polymer emulsions, epoxy polymer emulsions, butyl rubber emulsions, vinyl polymer emulsions, and vinyl acetate polymer emulsions that are suitable for providing the desired strength and flexibility to the inorganic fibrous material. Examples of suitable commercially available aqueous polymer emulsions may include, for example, any one of or any combination of those available under the trade designations "RHOPLEX HA-8" (a 44.5% by weight solids aqueous emulsion of acrylic copolymers) marketed by Rohm and Haas, Philadelphia, Pa., and "AIRFLEX 600BP" (a 55% solids ethylene vinyl acetate copolymer) marketed by Air Products, Allentown, Pa. The organic binder may also include at least one or more plasticizers. Plasticizers tend to soften a polymer matrix and thereby contribute to the flexibility and moldability of the inorganic fibrous material. The organic binder may also include one or more tackifiers or tackifying resins, for example, to aid in holding the inorganic fibrous material together. A possible example of a suitable tackifier is commercially available under the trade designation "SNOWTACK 810A" from Eka Nobel, Inc., Toronto, Canada.

The use of a flocculent as a component in the slurry is desirable for causing the organic binder and inorganic fibers to attract each other. A flocculent is typically added to such a slurry after the organic binder and inorganic fibers have been mixed a sufficient amount of time to be evenly distributed throughout the slurry. In this way, the use of a flocculent can help to insure that, when waste water is removed from the slurry (e.g., during the formation of the inorganic fibrous material), enough of the organic binder remains adhered to the inorganic fibers and other solid components of the slurry (e.g., intumescent materials, fillers, reinforcing components, etc.) that the resulting inorganic fibrous material can be handled or will otherwise exhibit the desired structural integrity. As used herein, the term "waste water" refers to the water and other components of the slurry that are removed from the slurry some time after the slurry is formed, e.g., when the inorganic fibrous material is formed or some other time after the slurry is formed.

In the conventional art of making nonwoven inorganic fibrous material for pollution control devices (e.g., mounting mats and thermal insulation), firestops, or other such uses, alum flocculents are typically used in the slurry. The present inventors discovered that such alum flocculents exhibit an acidic pH and when waste water removed from such a slurry is used in a subsequent slurry containing an alum flocculent or other acidic flocculent, the alum flocculent in the subsequent slurry appears to become ineffective. For example, the resulting nonwoven inorganic fibrous material can fail to exhibit desired properties (e.g., structural integrity), because not enough of the inorganic fibers and other solid slurry components (e.g., particles of intumescent material, fillers, etc.) are held together by enough of the organic binder present in the inorganic fibrous material.

While not intending to be bound by theories, it is believed that such a failure in flocculation of the subsequent slurry (e.g., as indicated by a lack of structural integrity of the resulting nonwoven inorganic fibrous material) is caused by residual reactive flocculent in the waste water causing premature flocculation of the organic binder in the subsequent slurry, before the organic binder, inorganic fibers and other solid slurry components have an opportunity to be evenly distributed throughout the subsequent slurry. As used herein, premature flocculation refers to greater than 20%, 25%, 30%, 35%, 40%, 45%, 50%, 55%, 60%, 65%, 70%, 75%, 80%, 85%, 90% or 95% by weight of the organic binder having already flocculated or otherwise precipitated out, without first being evenly distributed (i.e., before the organic binder is able to be mixed so as to be evenly distributed throughout the slurry) and deposited onto the inorganic fibers, and other optional solid ingredients of the slurry.

There are also flocculents that exhibit a basic pH (e.g., calcium, calcium hydroxide and sodium silicate). It is believed that the use of such base pH flocculents would cause the waste water of a slurry made with such a base pH flocculent to exhibit a base pH and when waste water removed from such a slurry was used in a subsequent slurry containing the same or another base pH flocculent, or possibly even an acidic pH flocculent, the flocculent in the subsequent slurry will likewise become ineffective. It is believed that this failure in flocculation of the slurry (e.g., lack of structural integrity of the resulting inorganic fibrous material) would also be caused by a residual amount of the reactive flocculent in the base pH waste water causing premature flocculation of the organic binder in the subsequent slurry, before the organic binder, inorganic fibers and other solid slurry components have an opportunity to be evenly distributed throughout the subsequent slurry. Similarly, it is also believed that if an acidic pH waste water (i.e., waste water containing enough residual reactive flocculent to give the waste water an acidic pH) was used in a subsequent slurry that used a base pH flocculent, or the same or another acidic pH flocculent, the reactivity of the acidic pH waste water could result in premature flocculation of the organic binder, as discussed above, and cause the flocculent in the subsequent slurry to likewise become ineffective.

The present inventors have also discovered that when some flocculents are used in a slurry of inorganic fibers, organic binder and water, waste water produced from the slurry (e.g., when used to make an inorganic fibrous material) can be recycled into a subsequent slurry without causing significant premature flocculation or precipitation of the organic binder in the subsequent slurry. Such flocculents can cause the pH of a corresponding waste water to remain or become neutral, and if such neutral pH waste water is used in a subsequent slurry with the same or similar flocculent, the neutral pH waste water can result in the flocculent used in the subsequent slurry remaining sufficiently effective to produce a commercially acceptable inorganic fibrous material. That is, the resulting inorganic fibrous material exhibits the desired properties (e.g., structural integrity), because a sufficient amount (i.e., greater than 50%, 55%, 60%, 65%, 70%, 75%, 80%, 85%, 90% or 95% by weight) of the inorganic fibers and other solid slurry components are held together by enough organic binder present in the inorganic fibrous material (e.g., enough of the organic binder flocculates or otherwise precipitates and adheres to enough of the solid slurry components). It is believed that such a neutral pH waste water could be used to form a subsequent slurry in which any type of flocculent (i.e., an acidic pH flocculent, base pH flocculent, or neutral pH flocculent) is added, without adversely affecting the effectiveness of the flocculent in the subsequent slurry.

While not intending to be bound by theories, it is believed that such a neutral pH waste water does not adversely affect the subsequent slurry, because the neutral pH waste water does not contain enough residual reactive flocculent to cause significant premature flocculation or other precipitation of the organic binder in the subsequent slurry. That is, significant flocculation of the organic binder does not occur until after the organic binder and the solid components of the slurry have an opportunity to be evenly distributed throughout the slurry, and the flocculent is added to the slurry. Thus, as used herein, the term "neutral pH waste water" is not necessarily limited to waste water exhibiting a neutral pH, but rather would include any waste water with a residual reactive flocculent content that is sufficiently low that the use of the neutral pH waste water would not cause significant premature flocculation or other precipitation of the organic binder in the subsequent slurry. The amount of residual reactive flocculent in the waste water can be in the range of from about 0%, and in increments of 1%, up to about 50% of the amount of reactive flocculent that was present in the slurry used to form the waste water, and any range therebetween (e.g., 1% to 40%, 5% to 30%, etc.).

Therefore, as used herein, the term "neutral pH flocculent" shall refer to any flocculent that produces a "neutral pH waste water", regardless of what pH the flocculent exhibits. Neutral pH flocculents of the present invention can also be seen as any flocculent that allows at least about 10% by volume (Vol. %), and in increments of 5 Vol. %, up to and including about 100% by volume (i.e., at least about 10%, 15%, 20%, 25%, 30%, 35%, 40%, 45%, 50%, 55%, 60%, 65%, 70%, 75%, 80%, 85%, 90%, 95%, or 100% by volume) of a corresponding neutral pH waste water to be recycled into a subsequent slurry, without adversely affecting flocculation (e.g., premature flocculation before the organic binder is homogeneously or evenly distributed throughout the slurry) in the subsequent slurry to any significant degree (e.g., by affecting the structural integrity of the inorganic fibrous material made from the slurry). It is desirable for the amount of neutral pH waste water being recycled to be commercially significant. A recycled amount of the neutral pH waste water is considered commercially significant, for example, when the savings from not having to pre-treat that amount of waste water before it is discharged is commercially significant. It can be commercially preferable for the subsequent slurry to contain at least about 25%, 30%, 35%, 40%, 45%, 50%, 55%, 60%, 65% or 70% of recycled neutral pH waste water. In addition, the degree of flocculation is not considered to be adversely affected by the use of the waste water, when the resulting inorganic fibrous material formed from the subsequent slurry exhibits the structural integrity (e.g., mechanical integrity) and other properties needed to function in its intended use (e.g., in mounting and/or insulating applications for a pollution control device, insulating other components of an exhaust system, firestop applications, etc.). Desirable results have been obtained, when the neutral pH flocculent used causes the pH of the waste water to remain relatively neutral.

A neutral pH flocculent, according to the present invention, may be a flocculent that exhibits a relatively neutral pH by itself, especially when compared to conventional Alum flocculents. Even so, a flocculent that exhibits a relatively acidic pH or basic pH by itself can still function as a neutral pH flocculent, according to the present invention, when the flocculent is so efficient at flocculating that there is not enough reactive flocculent left over or otherwise remaining in the extracted waste water to cause the waste water to adversely affect, to any significant degree, the flocculation in a subsequent slurry made with the waste water (e.g., by causing premature flocculation of the subsequent slurry made with the waste water). Therefore, a neutral pH flocculent can be any flocculent that, when used, (a) results in the pH of the corresponding waste water remaining relatively neutral and/or (b) results in or at least contributes to the corresponding waste water not adversely affecting subsequent flocculation when the waste water is added to a subsequent slurry. Thus, when at least some embodiments of a neutral pH flocculent is used in a slurry, in accordance with the present invention, the resulting waste water extracted from the slurry may exhibit a relatively neutral pH, especially when compared to waste water resulting from the use of a conventional alum flocculent.

It is believed that, because conventional alum flocculents are so inefficient, more of the alum flocculent is needed to produce a desirable degree of flocculation, which results in excess un-reacted (i.e., reactive) alum flocculent remaining in the waste water. The presence of excess reactive flocculent can cause the resulting waste water to have a relatively acidic pH and/or otherwise cause premature flocculation in a subsequent slurry made with waste water containing the reactive flocculent. It has also been found that the amount of conventional alum flocculent needed to obtain sufficient flocculation may be ten (10) times or more the amount required when using at least some neutral pH flocculents according to the present invention. Thus, neutral pH flocculents according to the present invention (e.g., Mid South 9307C) can include those that are so efficient that relatively small amounts can be used (especially when compared to conventional alum flocculents) and still produce sufficient flocculation.

In the context of the present invention, the pH of the waste water is considered neutral, when the addition of a commercially significant amount of the waste water from a previous or initial slurry into a subsequent slurry does not cause premature flocculation or precipitation of the organic binder in the slurry, before the organic binder and solid components have been mixed so as to be evenly distributed within the subsequent slurry. When the waste water is a sufficient neutral pH waste water, the inorganic fibrous material formed from the subsequent slurry (e.g., in the form of a flat or curved sheet, a one- or multiple-piece truncated cone, or any other desired two- or three-dimensional shape) is structurally viable (e.g., can be handled and installed without falling apart) or is otherwise commercially viable (e.g., can be used as a mounting mat, thermal insulation sheet, end cone insert, or other two- or three-dimensional fibrous structure suitable for its intended use, e.g., in a pollution control device or as a firestop).

Flocculents useful as neutral pH flocculents may include those comprising organic polymers having cationic groups. Though not a requirement, such flocculent polymers may be water-swellable, water-soluble, or water-dispersible. Examples of suitable neutral pH flocculents may include solutions (typically aqueous) or dispersions of poly(diallyldimethylammonium chloride) (hereinafter PDADMAC) and copolymers of dimethylamine and epichlorohydrin. Optionally, the neutral pH flocculent may further comprise a metal cation (for example, aluminum) which may be present in a dissociated, complex (for example, a hydrate, chloride, or chlorohydrate), or polymeric form (for example, as a poly(metal oxide) or oxychloride).

Examples of suitable commercially available flocculents, for use as neutral pH flocculents, may include those available from Garratt Callahan, Burlington, Calif., under the trade designations "FORMULA 7644" (aqueous solution of PDADMAC), "FORMULA 7643", "FORMULA 7642", "FORMULA AH—423", "FORMULA 7602", "FORMULA 7603", "FORMULA 7552", "FORMULA 7622", "FORMULA 7655", or "FORMULA 7568"; from Mid-South Chemical, Ringold, La., under the trade designation "MP 9307" (believed to be an aqueous solution of a copolymer of dimethylamine and epichlorohydrin); from Ciba Specialty Chemicals, Tarrytown, N.Y., under the trade designation "ZETAG 7125" (aqueous solution of PDADMAC), "ZETAG 7127" (aqueous solution of PDADMAC); and from Hawkins, St. Paul, Minn., under the trade designations "ARCTICFLOC AF12104" (aqueous solution of PDADMAC), "AQUA HAWK 2987" (aqueous solution of polyaluminum hydroxychloride and a cationic organic polymer), "AQUA HAWK 101" (aqueous solution of polyaluminum hydroxychloride and a poly(quaternary amine)), "AQUA HAWK 427" (aqueous solution of polyaluminum hydroxychloride and a poly(quaternary amine)), and "AQUA HAWK 2757" (aqueous solution of aluminum-based polyinorganic and a cationic organic polymer), and combinations thereof. It will be recognized that polyamines exist in aqueous media in equilibrium with protonated (that is, cationic and polycationic) forms.

The percentage of flocculent present in the slurry, whether an alum flocculent or a neutral pH flocculent, is based on the weight of the solid elements in the slurry (e.g., binder, fibers, fillers, intumescent materials, etc). For example, when making non-intumescent nonwoven fibrous materials, the percentage of the neutral pH flocculent used can be primarily based on the weight of the organic binder and inorganic fiber content of the slurry. When making intumescent nonwoven fibrous materials, the percentage of the neutral pH flocculent used can be primarily based on the weight of the organic binder, inorganic fiber and intumescent material content of the slurry. The amount of water used in the slurry can affect the amount of the neutral pH flocculent needed. In general, more of the flocculent is needed for a given amount of slurry solids (e.g., organic binder and inorganic fibers) as the water content of the slurry is increased. It is believed this is because the concentration of the flocculent in the slurry decreases as additional water is added to the slurry.

In general, the neutral pH flocculent is used in an amount effective to flocculate the organic binder being used (e.g., an emulsified organic polymer binder). Desirable results have been obtained even when the amount of neutral pH flocculent being used is considerably less than the amount of alum flocculents conventionally used. Although other amounts may also be used, it can be desirable for the neutral pH flocculent (on a solids basis) to be present in the slurry in an amount that is considerably lower than the amount of conventional alum flocculents typical used. For example, The amount of neutral pH flocculent used can be in the range of from at least about 0.2%, and in increments of 0.1%, up to and including about 5%, and maybe even up to about 10%, based on the dry weight of the slurry components, and any range therebetween (e.g., in the range of from at least about 0.25% up to and including about 5%, 4%, 3%, 2% or 1%). In contrast, conventional alum flocculents need to be used in an amount from at least greater than 5% up to possibly even 50%. In typical applications, alum flocculents have been used in an amount of about 20%, while neutral pH flocculents have been used in an amount of about 1%.

Table 1 (below) lists flocculents that may be useful as neutral pH flocculents according to the present invention.

TABLE 1

| FLOCCULENT | DESCRIPTION |
|---|---|
| 1 | cationic water-soluble polymer in emulsion, available under the trade designation "ARCTICFLOC 12100" from Orca Water Technologies, Ventura, California |
| 2 | cationic polymer in solution, available under the trade designation "FORMULA 7644" from Garratt Callahan Co., Burlingame, California |
| 3 | cationic polymer in solution, available under the trade designation "FORMULA 7602" from Garratt Callahan Co. |
| 4 | medium high molecular weight, liquid cationic polyelectrolyte, available under the trade designation "ARCTICFLOC 12104" from Orca Water Technologies |
| 5 | cationic polymer in solution, available under the trade designation "FORMULA 7603" from Garratt Callahan Co. |
| 6 | mixture containing polyaluminum hydroxychloride and a cationic organic polymer available under the trade designation "AQUA HAWK 2987" from Hawkins, Inc., Minneapolis, Minnesota |
| 7 | cationic water-soluble polymer in solution available under the trade designation "FORMULA 7552" from Garratt Callahan Co. |
| 8 | cationic polymer in solution, available under the trade designation "FORMULA 7622" from Garratt Callahan Co. |
| 9 | mixture of about 7 percent polyamine and about 33 percent aluminum chloride in water, available under the trade designation "MP 9307C" from Mid South Chemical |
| 10 | cationic polymer in solution, available under the trade designation "FORMULA 7643" from Garratt Callahan Co. |
| 11 | 25-50 percent solution of a cationic homopolymer (2-propen-1-aminium,N,N-dimethyl-N-2-propenyl-, chloride, homopolymer (9CI)), available under the trade designation "ZETAG 7127" from Ciba Specialty Chemicals, Tarrytown, New York |
| 12 | cationic polymer in solution, available under the trade designation "FORMULA 7655" from Garratt Callahan Co. |
| 13 | 38.5-40 percent solution of organic cationic polyelectrolyte (2-propen-1-aminium,N,N-dimethyl-N-2-propenyl-, chloride, homopolymer (9CI)), available under the trade designation "ZETAG 7125" from Ciba Specialty Chemicals |
| 14 | mixture of polyaluminum chloride, polyamines, and cationic polymer, available under the trade designation "FORMULA AH-710" from Garratt Callahan Co. |

TABLE 1-continued

| FLOCCULENT | DESCRIPTION |
| --- | --- |
| 15 | mixture of 28-30 percent polyaluminum hydroxychloride and 11-14 percent polyquaternary amine, available under the trade designation "AQUA HAWK 101" from Hawkins, Inc. |
| 16 | mixture of 38-40 percent polyaluminum hydroxychloride and 2-3 percent polyquaternary amine, available under the trade designation "AQUA HAWK 427" from Hawkins, Inc. |
| 17 | mixture of aluminum based polyinorganic and cationic polymer available under the trade designation "AQUA HAWK 2757" from Hawkins, Inc. |
| 18 | cationic polymer in emulsion available under the trade designation "FORMULA 7568" from Garratt Callahan Co. |
| 19 | cationic polymer in solution, available under the trade designation "FORMULA 7642" from Garratt Callahan Co. |
| 20 | mixture of aluminum chlorohydrate and cationic polymer, available under the trade designation "FORMULA AH-423" from Garratt Callahan Co. |
| 21 | cationic polymer in solution, available under the trade designation "FORMULA 7633" from Garratt Callahan Co. |
| 22 | cationic water-soluble polymer in emulsion, available under the trade designation "FORMULA 7564" from Garratt Callahan Co. |
| 23 | cationic water-soluble polymer in emulsion, available under the trade designation "FORMULA 7542" from Garratt Callahan Co. |
| 24 | cationic water-soluble polymer in emulsion, available under the trade designation "FORMULA 7536" from Garratt Callahan Co. |
| 25 | cationic water-soluble polymer in emulsion, available under the trade designation "FORMULA 7520" from Garratt Callahan Co. |
| 26 | cationic water-soluble polymer in emulsion, available under the trade designation "FORMULA 7516" from Garratt Callahan Co. |
| 27 | cationic water-soluble polymer in emulsion, available under the trade designation "FORMULA 7547" from Garratt Callahan Co. |
| 28 | cationic water-soluble polymer in emulsion, available under the trade designation "FORMULA 7502" from Garratt Callahan Co. |
| 29 | cationic water-soluble polymer in emulsion, available under the trade designation "FORMULA 7506" from Garratt Callahan Co. |
| 30 | cationic water-soluble polymer in emulsion, available under the trade designation "FORMULA 7577" from Garratt Callahan Co. |

Before the present invention, the waste water from conventional methods of making inorganic fibrous materials from a slurry had to be discarded (e.g., into a storage pond, into a sewer when permitted, etc.) or subjected to expensive water treatments, before the waste water could be reused or disposed of. The present invention enables all, most, or at least significant quantities of waste water to be reused or recycled so as to form at least about 10%, and in increments of 1.0%, up to and including possibly even about 100% (e.g., 10%, 15%, 20%, 25%, 30%, 35%, 40%, 45%, 50%, 55%, 60%, 65%, 70%, 75%, 80%, 85%, 90% or 95%, and possibly even 100%) of the water used to make the slurry. The remainder of the water needed for the slurry, if any, is a quantity of relatively clean water (i.e., not waste water), for example, from a source like a residential or commercial tap water supply.

The quantity of waste water used can depend on the ability to control and maintain the consistency of the resulting slurry composition. The consistency of the slurry composition can affect whether the properties of the resulting inorganic fibrous material will be consistent from one slurry to the next. Consistency in the properties of each batch or run of inorganic fibrous material can be commercially desirable. In addition, because its pH is kept relatively neutral, the waste water can be more easily disposed of or discarded, without or at least with less special or expensive water treatments. For example, it may be acceptable to dispose of the neutral pH waste water produced according to the present invention directly into most municipal sewer systems or, at most, by first diluting the neutral pH waste water with a quantity of relatively clean water (i.e., not waste water) before disposing of it into the sewer system.

Optionally, the nonwoven fibrous material according to the present invention may comprise one or more intumescent materials, depending on the desired end use. The intumescent materials may be unexpanded, partially expanded, or a mixture thereof. For example, for use at temperatures above about 500° C., unexpanded vermiculite materials are suitable since they start to expand at a temperature range of from about 300° C. to about 340° C. This may be useful to fill the expanding gap between an expanding metal housing and a monolith in a catalytic converter. For use at temperatures below about 500° C., such as in diesel monoliths or particulate filters, expandable graphite or a mixture of expandable graphite and unexpanded vermiculite materials may be desired since expandable graphite starts to expand or intumesce at about 210° C. Treated vermiculites are also useful and typically expand at a temperature of about 290° C.

Examples of potentially useful intumescent materials include unexpanded vermiculite flakes or ore, treated unexpanded vermiculite flakes or ore, partially dehydrated vermiculite ore, expandable graphite, mixtures of expandable graphite with treated or untreated unexpanded vermiculite ore, hydrobiotite, water swellable synthetic tetrasilicic fluorine type mica described in U.S. Pat. No. 3,001,571 (Hatch), alkali metal silicate granules as described in U.S. Pat. No. 4,521,333 (Graham et al.), processed expandable sodium silicate (for example, insoluble sodium silicate commercially available under the trade designation "EXPANTROL" from 3M Company), and mixtures thereof. An example of a commercially available expandable graphite material is that available under the trade designation "GRAFOIL Grade 338-50" expandable graphite flake, from UCAR Carbon Co., Cleveland, Ohio. Treated unexpanded vermiculite flakes or ore may include unexpanded vermiculite treated by processes such as by being ion exchanged with ion exchange salts such as ammonium dihydrogen phosphate, ammonium nitrate, ammonium chloride, potassium chloride, or other suitable compounds as is known in the art.

The step of forming a nonwoven fibrous material according to the present invention can be performed using any suitable technique including, for example, conventional wet-laid methods. One such process for forming a nonwoven fibrous material using the slurry can be a traditional wet-laid non-woven papermaking technique. Briefly, such a process can include mixing the slurry components together and depositing (e.g., pouring) the resulting slurry onto a wire mesh, screen or other porous surface to remove most of the water. A generally two-dimensional sheet results that is then dried to form the nonwoven fibrous material. The nonwoven fibrous material may then be converted to a desired final form such as sheets and mats (e.g., by die cutting, laser cutting, etc.). Other wet-laid type forming processes may include the use of a mold having a mold cavity in which the slurry is poured or otherwise deposited and the waste water removed (e.g., by using a vacuum to suction or pull waste water through a mesh, screen or other porous or perforated surface defining at least part of the mold cavity). Such a mold can be used to form a nonwoven fibrous material having a preliminary form or a final desired form (e.g., a two-dimensional or three-dimensional shape). Such forming processes may be carried out in any one or any combination of a step-wise, batch, and/or continuous fashion.

When making the slurry, higher density materials such as the optional intumescent material and higher density fillers (if used) may be added to the slurry in a smaller volume mixing vessel at a constant rate just prior to the depositing step. Slurries containing such materials are agitated sufficiently so as to prevent these higher density materials, which are typically in the form of particles, from settling out in the mixing tank prior to being deposited (e.g., poured) the slurry onto the mesh or screen, or into the mold. Such slurries should typically be partially dewatered almost immediately or soon after being deposited on the mesh or screen, or into the mold, so as to prevent undesirable settling of the higher density materials. Vacuum dewatering of the slurries can be desirable. Useful methods for further dewatering or drying can include wet pressing the dewatered slurries through, e.g., compression or pressure rollers followed by passing the resulting nonwoven fibrous material through, optional heated rollers and then, forced hot air drying as is known in the art. If a mold is used to make the nonwoven fibrous material or a structure thereof, the dewatered slurry can be formed in a cavity of a female mold die, followed by a mating male mold die being inserted into the mold cavity under an applied pressure so as to wet press the dewatered slurry to form a resulting nonwoven fibrous material having a preliminary form or a final desired form (e.g., a two-dimensional or three-dimensional shape), Alternatively, the dewatered slurry can be formed on the surface of a male mold die, followed by being mated into a female mold die cavity under an applied pressure so as to wet press the dewatered slurry to form a resulting nonwoven fibrous material having a preliminary form or a final desired form (e.g., a two-dimensional or three-dimensional shape), Such pressing operations can also reduce the thickness and/or increase the density of the resulting nonwoven fibrous material. The resulting nonwoven fibrous material can be made to have a desired thickness and/or density by using an organic binder in the fibrous material that can be cured or set (e.g., by causing the organic binder to crosslink and/or solidify) while the nonwoven fibrous material is in the compressed state. For example, when the organic binder is a heat curable type, heat can be applied to the compressed nonwoven fibrous material to cause a necessary degree of curing. Once the organic binder has cured, the fibrous material can maintain the thickness and/or density desired, even after the pressing operation is complete and the nonwoven fibrous material is removed.

Nonwoven fibrous material according to the present invention can comprise, on a dry weight basis, in the range of from about 30 percent, and in increments of about 0.5 percent, up to and including about 99.5 percent of the inorganic fibers, and any range therebetween (e.g., from about 40 to about 98.5 percent by weight, from about 50 to about 98 percent by weight, from about 60 to about 97.5 percent by weight, or from about 70 to about 97 percent by weight). The nonwoven fibrous material can also comprise an organic binder in the range of from about 0.5 percent, and in increments of about 0.5 percent, up to and including about 15 percent by weight, and any range therebetween (e.g., from about 0.5, 1.0, or 1.5 up to and including about 3, 4, 5, 6, 7, 8, 9, 10, 11, 12, 13, 14 or 15 percent by weight). For firestop applications, the organic binder content may be even higher. Optionally, the nonwoven fibrous material can comprise in the range of from about 15 percent, and in increments of about 1 percent, up to and including about 70 percent by weight of intumescent material, and any range therebetween (e.g., from about 20 percent up to and including about 60 percent). Although, the use of compositions falling outside these ranges may also be desirable. In embodiments where intumescent material and other such material is not included, on a dry weight basis, it can be desirable for the percentage of inorganic fibers to be at least about 85 percent by weight (e.g., at least 90, 91, 92, 93, 94, 95 percent by weight, or more), although lower weight percentages may also be useful.

Nonwoven fibrous material of the invention may optionally contain one or more inorganic fillers, inorganic binders, organic fibers, and any combination or mixture thereof. Examples of possible fillers may include delaminated vermiculite, hollow glass microspheres, perlite, alumina trihydrate, magnesium phosphate hexahydrate, calcium carbonate, and mixtures thereof. Fillers may be present in the nonwoven fibrous material at levels in the range of from 0 percent, and in increments of 1 percent, up to and including about 50 percent by dry weight of the nonwoven fibrous material, and any range therebetween (e.g., up to and including 10, 15, 20, 25, 30, 35, 40, 45 or 50 percent). Examples of possible inorganic binders may include micaceous particles, kaolin clay, bentonite clay, and other clay-like minerals. Inorganic binders may be present in the nonwoven fibrous material at levels in the range of from 0, and in increments of 1 percent, up to and including about 50 percent by dry weight of the nonwoven fibrous material, and any range therebetween (e.g., up to and including about 10, 15, 20, 25, 30, 35, 40, 45 or 50 percent). Optionally, organic fibers (for example, staple fibers or fibrillated fibers) may be included in the nonwoven fibrous material of the present invention, for example, to provide wet strength during processing and dry strength and resiliency in its intended use (e.g., as a mat or sheet mounting material prior to being canned or otherwise installed in a pollution control device). However, in general, it can be desirable to minimize the content of organic fibers and other organic materials, especially for pollution control device applications, as the organic components can contribute to objectionable results (e.g., smoke and odors) when they burn-off during their use at temperatures above their combustion temperature. Other additives or process aides that may be included in nonwoven fibrous material according to the present invention can include defoaming agents, surfactants, dispersants, wetting agents, salts to aid precipitation, fungicides, and bactericides.

Nonwoven fibrous materials according to the present invention are formulated to have physical properties suitable for their intended use (e.g., in pollution control devices), although it may be formulated with different physical properties if desired. For example, it can be desirable for the nonwoven fibrous material to have sufficient flexibility to pass the FLEXIBILITY TEST (as described hereinbelow) using a mandrel having a diameter of 6 inches (15.24 cm), 5 inches (12.70 cm), 4 inches (10.16 cm), 3 inches (7.62 cm), 2 inches (5.08 cm), 1 inch (2.54 cm), ¾ inch (1.91 cm), or even ½ inch (1.27 cm). Moreover, it can be desirable for the present nonwoven fibrous material to have a tensile strength, according to the TENSILE STRENGTH TEST (as described hereinbelow), of at least 7.3 pounds per square inch or psi (50 kPa), 10.7 psi (75 kPa), or 14.5 psi (100 kPa).

Nonwoven fibrous materials according to the present invention may further include edge protection materials. Examples of suitable edge protection materials include a stainless steel wire screen wrapped around the edges as described in U.S. Pat. No. 5,008,086 (Merry), and braided or rope-like ceramic fiber braiding or metal wire material as described in U.S. Pat. No. 4,156,533 (Close et al.). Edge protectants may also be formed from compositions having glass particles as described, for example, in EP 639 701 A1 (Howorth et al.), EP 639 702 A1 (Howorth et al.), and EP 639 700 A1 (Stroom et al.). Other examples of suitable edge protection materials include strips of polycrystalline and other nonwoven fibrous materials as described in U.S. Pat. No. 5,882,608 (Sanocki et al.).

FIG. 1 shows exemplary uses for nonwoven fibrous materials according to the present invention. Namely, a pollution control device 10 such as a catalytic converter. The pollution control device 10 includes a housing 12 with a generally conical shaped inlet 14 and outlet 16 commonly referred to as end cones regions. Housing 12, which is commonly referred to as a can or a casing, is usually made of metal (for example, stainless steel). Typically disposed within housing 12 is a monolithic structure 18 made of a ceramic or metallic material, which may be coated with a catalyst. A mat 22 of thermally insulating mounting material surrounds and mounts the monolithic structure 18 within the housing 12. Monolithic structure 18 may be, for example, a catalytic converter element or a diesel particulate filter element. A nonwoven fibrous material according to the present invention may be used as the mat 22. Each of the inlet 14 and outlet 16 end cone regions of the metal housing 12 include an inner end cone housing 28 and an outer end cone housing 26. The end cone housings forming the inlet 14 and outlet 16 may have the same or a different configuration. Insulation material 30 can be positioned between the inner end cone housing 28 and the outer end cone housing 26. A nonwoven fibrous material according to the present invention may be used as insulation material 30.

Nonwoven fibrous material in the form of mounting mat 22, according to the present invention, may be disposed between the monolith 18 and the housing 12 in similar fashion for either a catalytic converter or a diesel particulate filter. This can be done, for example by wrapping the monolith 18 with the mounting mat 22 and inserting the wrapped monolith into the housing 12. Likewise, end cone shaped nonwoven fibrous material 30 may be first positioned on each inner end cone housing 28 and then an outer end cone housing 26 is disposed over the insulation 30 and welded in place to the inner end cone housing. Many pollution control devices are well known in the art and include, for example, catalytic converters, end cone sub-assemblies, and diesel particulate traps and filters. Further details concerning such devices may be found, for example, in U.S. Pat. No. 5,882,608 (Sanocki et al.) and U.S. Publ. Pat. Appln. No. 2006/0154040 A1 (Merry).

Nonwoven fibrous materials according to the present invention may have any dimension and/or thickness suitable for its intended use. However, for use in pollution control devices, the thickness of exemplary nonwoven fibrous material, according to the CALIPER MEASUREMENT GENERAL PROCEDURE (as disclosed hereinbelow), is typically in a range of from about 0.1 inch (0.3 cm), and in increments of about 0.1 inches (0.3 cm), up to and including about 2 inch (5.0 cm), and any range therebetween (e.g., from about 0.1 inch (0.3 cm), 0.15 inch (0.38 cm) or 0.2 inch (0.5 cm) up to and including about 0.3 (0.8 cm), 0.5 (1.3 cm), 0.7 (1.8 cm), or 1 inch (2.5 cm)), or more. For use in pollution control devices, nonwoven fibrous materials according to the present invention typically have a dry basis weight in the range of from about 400 grams per square meter (gsm), and in increments of about 100 gsm, up to and including about 15000 gsm, and any range therebetween (e.g., from about 700, 1000, 1500, or 2000 up to and including about 5000, 10000, or 15000 gsm). Non-intumescent nonwoven fibrous materials according to the present invention typically have a dry basis weight in the range of from about 400 gsm, and in increments of about 100 gsm, up to and including about 2500 gsm, and any range therebetween (e.g., from about 1000 gsm up to and including about 1500 gsm). Intumescent nonwoven fibrous materials according to the present invention typically have a dry basis weight in the range of from about 1200 gsm, and in increments of about 100 gsm, up to and including about 15000 gsm, and any range therebetween (e.g., from about 2400 gsm up to and including about 8000 gsm).

Test Methods

Flexibility Test (Crack Test)

Verify that the specimen to be tested is not already cracked by bending slightly on both sides and visually inspecting. Cracked specimens should not be used. Cut 1-inch wide strip(s) of the specimen to be tested, minimum 4 inches (10 cm) long, using a stainless steel rule die. Gently wrap one face of the strip 180 degrees (half way) around a 6-inch (15.24-cm) diameter cylindrical mandrel (at least 2 inches (5.1 cm) in length) using the minimum necessary force to ensure the strip is around the mandrel and hold the strip for at least 30 seconds. Visually inspect the strip for fiber separation or cracking. Repeat using progressively smaller diameter mandrels with diameters of 5 inches, 4 inches, 3 inches, 2 inches, 1 inch, 0.75 inch, 0.5 inch) (12.70 cm, 10.16 cm, 7.62 cm, 5.08 cm, 2.54 cm, 1.91 cm, 1.27 cm) until either fiber separation or cracking is observed. Continue until cracking is visually observed. A specimen passes the Flexibility Test, if no fiber separation or cracking other than inconsequential or superficial cracking is visually observed.

Tensile Strength Test

A specimen to be tested is cut into one inch (2.5 cm) wide by seven inches (18 cm) long strips after the caliper is measured according to the CALIPER MEASUREMENT PROCEDURE (above). The ends of one strip are clamped into one inch square pneumatic grips in a suitable load frame capable of recording peak tensile load at the samples breaking point such that there is six inches (15 cm) of strip between the ends of the grips. The strip is then pulled apart at a speed of 1 inch (2.54 cm) per minute, and the peak load supported by the sample before breaking is recorded. The tensile strength is defined as the peak load divided by the cross sectional area calculated by multiplying the width of the sample divided by the caliper.

Caliper Measurement General Procedure

A digital micrometer is calibrated to read zero inches (0 cm) when placed over a cylindrical deadweight that is placed on a smooth metal base plate. The cylindrical deadweight has a base diameter of 2.5 inches (6.35 cm) and has sufficient weight to apply a pressure of 0.712 psi (4.9 kPa). The cylindrical deadweight is then placed over the specimen (for example, a sheet) that is being measured and the caliper of the specimen is determined by placing the calibrated digital micrometer over the deadweight.

Exemplary Procedure for Preparing Nonwoven Fibrous Material

Example 1

4000 ml of tap water is added to a one gallon Waring blender. 70 g of CERAFIBER (from Thermal Ceramics, Augusta, Ga.) is added to the blender (fiber has been previously cleaned to a shot content of approximately 20% and annealed at 1050° C.). The blender is operated at low speed for 5 seconds. The resultant slurry is poured into a mixing container and kept agitated with an air mixer at a medium speed to keep the solids suspended. 1.73 g of defoaming agent (Foamaster 111 from Henkel, Edison N.J.) is added followed by 9.0 g of ethylene-vinyl acetate terpolymer latex (trade designation AIRFLEX 600BP, 55% weight solids from Air Products). 1.5 g of flocculent (MP9307C from Mid South Chemical) is then added after about 1 minute of mixing. Mixing is continued from 1 to 3 minutes. The mixer is removed and the contents poured into an 8 inch by 8 inch (20.3 cm by 20.3 cm) sheet former or mold and drained. The sheet former can have, e.g., four solid side walls (dimensioned with an 8 inch by 8 inch interior) and a perforated bottom (e.g., formed by a screen), with the perforations being sized so as to retain most, if not all, of the solids from the slurry while allowing the water to pass therethrough. A couple of sheets of blotter paper are laid over the drained sheet, and it is rolled with a rolling pin 3 times before being removed and pressed between blotter papers at a surface pressure of 13-14 psi (90-97 kPa) for five minutes. The sheet is then dried at 150° C. in a forced air oven for 10-15 minutes, and allowed to equilibrate overnight while exposed to ambient atmosphere before testing.

TABLE 2

(Wt % of Components of Example 1)

|  | wet gr. | dry gr. | % |
| --- | --- | --- | --- |
| water | 4000 | 0.00 | 0.00% |
| C-fiber (HT Cerafiber) | 70 | 70.00 | 93.40% |
| defoamer | 1.73 | 0.00 | 0.00% |
| Airflex 600BP | 9 | 4.95 | 6.60% |

TABLE 2-continued (Wt % of Components of Example 1)

|  | wet gr. | dry gr. | % |
| --- | --- | --- | --- |
| Mid South 9307C (Mojo) | 1.5 | 0.00 | 0.00% |
| rinse water | 400 | 0.00 | 0.00% |
| Consistency (fiber) at coag | 1.720% |  |  |
| theoretical LOI | 6.60% |  |  |
| Consistency (fiber) final | 1.566% |  |  |
| Total | 4482.23 | 74.95 | 100.00% |

Example 2

A fibrous sheet is made as described above for Example 1, except using 2000 ml of tap water and 2000 ml of waste water. The waste water was obtained by making a slurry as in Example 1, but instead of pouring the slurry into the sheet molder it was filtered through a filter bag to filter out most or all of the solids. The PH of the waste water was measured with PH paper and found to be about 7.36.

Examples 3, 5, 7, 9, 11, 13 and 15 were made as described above for Example 1, except as indicated in Tables 3 and 4. Examples 4, 6, 8, 10, 12 and 14 were made as described above for Example 2, except as indicated in Tables 3 and 4.

TABLE 3

(Composition)

| Exs | Clean Water (ml) | Waste Water (ml) | Cerafiber* (g) | BP 600 Binder (g) | HA-8 Binder (g) | Flocculent Amount (g) | Defoamer Amount (g) |
| --- | --- | --- | --- | --- | --- | --- | --- |
| 1 | 4000 | 0 | 70 | 9.0 |  | 1.5 g | 1.73 |
| 2 | 2000 | 2000 | 70 | 9.0 |  | 1.5 | 1.73 |
| 3 | 4000 | 0 | 70 | 9.0 |  | 2.5 | 1.73 |
| 4 | 2000 | 2000 | 70 | 9.0 |  | 2.5 | 1.73 |
| 5 | 4000 | 0 | 70 | 9.0 |  | 3.8 | 1.73 |
| 6 | 2000 | 2000 | 70 | 9.0 |  | 3.8 | 1.73 |
| 7 | 4000 | 0 | 70 | 9.0 |  | 1.9 | 1.73 |
| 8 | 2000 | 2000 | 70 | 9.0 |  | 1.9 | 1.73 |
| 9 | 4000 | 0 | 70 | 9.0 |  | 3.8 | 1.73 |
| 10 | 2000 | 2000 | 70 | 9.0 |  | 3.8 | 1.73 |
| 11 | 4000 | 0 | 70 | 9.0 |  | 5.3 | 1.73 |
| 12 | 2000 | 2000 | 70 | 9.0 |  | 5.3 | 1.73 |
| 13 | 4000 | 0 | 70 |  | 9.0 | 0.95/ 8.35** | 1.73 |
| 14 | 2000 | 2000 | 70 |  | 9.0 | 0.95/ 8.35** | 1.73 |
| 15 | 4000 | 0 | 70 |  | 18.0 | 1.9/ 16.7** | 1.73 |
| 16 | 2000 | 2000 | 70 |  | 18.0 | 1.9/ 16.7** | 1.73 |

*Clean & Annealed

**Sodium Aluminate/Alum (the first number is Sodium Aluminate and the second number is Alum)

TABLE 4

(Test Results)

| Exs | Flocculent | Recycled Waste Water | Waste Water (PH) | Thickness (mm) | Tensile strength (kPa) | Loss on Ignition (Wt. %)*** | Flexibility Test |
|---|---|---|---|---|---|---|---|
| 1 | MP9307C* | no | | 11.99 | 61 | 5.38 | Crack 3" |
| 2 | MP9307C* | yes | 7.36 | 12.55 | 33 | 5.33 | Broke 3" |
| 3 | Aqua Hawk 2887 | no | | 12.90 | 30 | 3.64 | OK 2" |
| 4 | Aqua Hawk 2887 | yes | 7.00 | 11.43 | 87 | 7.80 | Crack 2" |
| 5 | Aqua Hawk 2887 | no | | 11.83 | 26 | 2.55 | OK 2" |
| 6 | Aqua Hawk 2887 | yes | 6.82 | 12.31 | 73 | 7.12 | OK 2" |
| 7 | Formula 7602 | no | | 13.07 | 33 | 3.82 | OK 2" |
| 8 | Formula 7602 | yes | 7.47 | 12.84 | 43 | 6.96 | OK 2" |
| 9 | Formula 7602 | no | | 12.14 | 46 | 2.73 | Crack 2" |
| 10 | Formula 7602 | yes | 7.12 | 12.91 | 44 | 4.74 | OK 2" |
| 11 | Formula 7644 | no | | 12.98 | 55 | 3.30 | OK 2" |
| 12 | Formula 7644 | yes | 7.27 | 12.84 | 64 | 4.84 | OK 2" |
| 13 | SA Alum*** | no | | 14.08 | 11 | 4.66 | Crack 4" |
| 14 | SA Alum*** | yes | 4.20 | 13.14 | 28 | 4.07 | Crack 4" |
| 15 | SA Alum*** | no | | 11.90 | 74 | 10.08 | OK 2" |
| 16 | SA Alum*** | yes | 4.49 | 11.33 | 47 | 9.07 | Crack 4" |

*Crack Test Results OK at 4"
** The amount of organics burned off
***Sodium Aluminate and Alum Additional Embodiments Methods of Making Nonwoven Fibrous Materials Embodiments 1. A method of making nonwoven fibrous materials, the method comprising:
   providing a first slurry comprising water such as, e.g., waste water, relatively clean water (e.g., regular residential, commercial tap water, or any other water that is commercially acceptable for use in the slurry and is not waste water), one or multiple types of first inorganic fibers, one or more first organic binders, and a first neutral pH flocculent;
   separating or otherwise removing (e.g., by using gravity, squeezing, and/or applying a vacuum or other suction force against the first slurry) a quantity of a first waste water from the first slurry (e.g., removed before, during, or after the forming of the first nonwoven fibrous material or otherwise from the first slurry);
   optionally forming (e.g., by a wet laid paper making process, molding process, etc.) a first nonwoven fibrous material (e.g., in the form of a flat or curved sheet, a one- or multiple-piece truncated cone, or any other desired two- or three-dimensional shape) from the first slurry;
   providing a second slurry comprising a quantity of the first waste water (e.g., removed before, during, or after the forming of the first nonwoven fibrous material or otherwise from the first slurry), an optional quantity of relatively clean water that is not waste water, one or multiple types of second inorganic fibers, which are the same and/or different than those used in the first slurry, one or more second organic binders, which are the same and/or different than those used in the first slurry, and a second flocculent that is the same and/or a different flocculent than that used in the first slurry; and
   forming (e.g., by a wet laid paper making process, molding process, etc.) a second nonwoven fibrous material (e.g., in the form of a flat or curved sheet, a one- or multiple-piece truncated cone, or any other desired two- or three-dimensional shape) from the second slurry,
   wherein the addition of first waste water in the second slurry does not adversely affect the flocculation of the second organic binder in the second slurry. The first waste water in the second slurry can be seen as not adversely affecting the flocculation of the second organic binder in the second slurry, for example, when the second slurry does not exhibit significant premature flocculation of the second organic binder due to the use of the first waste water in the second slurry.

Preferably, the use of the first neutral pH flocculent causes the first waste water to maintain a relatively neutral pH. It is believed that the neutral pH of the second waste water is the result of only or mostly the second neutral pH flocculent and that the first neutral pH flocculent provides little or no help in maintaining the neutral pH of the second waste water. The nonwoven fibrous materials can be, for example, in the form of a flat or curved sheet or mat, a one- or multiple-piece truncated cone, or any other desired two- or three-dimensional shape. In addition, the nonwoven fibrous material can be operatively adapted (i.e., dimensioned, composed, and/or configured) so as to be suitable for use in a variety of applications. In general, the resulting nonwoven fibrous material can be suitable for use as thermal insulation, acoustic insulation and the like. Because of its inorganic material content, it can be desirable to use the nonwoven fibrous material in high temperature applications such as, for example, in pollution control devices (e.g., as a mounting mat, thermal insulation sheet or end cone insert, etc.), or as a firestop or a component of a firestop article. The nonwoven fibrous material of the present invention, however, is not necessarily limited to only being used as described or identified herein.

2. The method according to embodiment 1, further comprising forming a first nonwoven fibrous material from the first slurry.

3. The method according to embodiment 2, wherein during the forming of the first nonwoven fibrous material from the first slurry, a quantity of the first waste water is separated or otherwise removed from the first slurry, while the first inorganic fibers are formed into the first nonwoven fibrous material.

4. The method according to any one of embodiments 1 to 3, wherein the second slurry comprises a quantity of relatively clean water.

5. The method according to any one of embodiments 1 to 4, wherein the second flocculent comprises a second neutral pH flocculent, which is the same and/or a different flocculent than that used in the first slurry, and the method further comprises:
   separating or otherwise removing a quantity of a second waste water from the second slurry (e.g., removed before, during, or after the forming of the second nonwoven fibrous material or otherwise from the second slurry).

6. The method according to embodiment 5, wherein during the forming of the second nonwoven fibrous material from the second slurry, a quantity of the second waste water is separated or otherwise removed from the second slurry, while the second inorganic fibers are formed into the second nonwoven fibrous material.

7. The method according to any one of embodiments 1 to 6, wherein the second flocculent comprises a second neutral pH flocculent, which is the same as or a different flocculent than that used in the first slurry.

8. The method according to any one of embodiments 1 to 6, wherein the second flocculent comprises a second neutral pH flocculent, which is the same as or a different flocculent than that used in the first slurry, and the method further comprises:
   separating or otherwise removing a quantity of a second waste water from the second slurry (e.g., removed before, during, or after the forming of the second nonwoven fibrous material or otherwise from the second slurry);
   providing a third slurry comprising a quantity of the second waste water (e.g., removed before, during, or after the forming of the second nonwoven fibrous material or otherwise from the second slurry), an optional quantity of relatively clean water that is not waste water, one or multiple types of third inorganic fibers, which are the same and/or different than those used in the second slurry, one or more third organic binders, which are the same and/or different than those used in the second slurry, and a third neutral pH flocculent, which is the same as or a different flocculent than that used in the second slurry; and
   forming (e.g., by a wet laid paper making process, molding process, etc.) a third nonwoven fibrous material (e.g., in the form of a flat or curved sheet, a truncated cone, or any other desired two- or three-dimensional shape) from the third slurry;
   wherein the addition of the second waste water in the third slurry does not adversely affect the flocculation of the third organic binder in the third slurry. The second waste water in the third slurry can be seen as not adversely affecting the flocculation of the third organic binder in the third slurry, for example, when the third slurry does not exhibit significant premature flocculation of the third organic binder due to the use of the second waste water in the third slurry.

Preferably, the use of the second neutral pH flocculent causes the second waste water to maintain a relatively neutral pH. It is believed that the neutral pH of the third waste water is the result of only or mostly the third neutral pH flocculent and that the first and second neutral pH flocculants provide little or no help in maintaining the neutral pH of the third waste water.

9. The method according to embodiment 8, wherein the third slurry comprises a quantity of relatively clean water.

10. The method according to embodiment 8 or 9 further comprising:
    separating or otherwise removing a quantity of a third waste water from the third slurry (e.g., removed before, during, or after the forming of the third nonwoven fibrous material or otherwise from the third slurry).

11. The method according to embodiment 10, wherein the separating occurs during the forming of the third nonwoven fibrous material from the third slurry (i.e., while the third inorganic fibers are formed into the third nonwoven fibrous material).

12. The method according to any one of embodiments 8 to 11, wherein the third neutral pH flocculent is the same as the second neutral pH flocculent.

13. The method according to any one of embodiments 8 to 12, wherein for each additional $N^{th}$ slurry, the method further comprises:
    providing an $N^{th}$ slurry comprising a quantity of waste water removed from a previous slurry or an $N^{th}-1$ slurry (e.g., removed before, during, or after the forming of the previous nonwoven fibrous material or otherwise from the previous slurry), an optional quantity of relatively clean water that is not waste water, one or multiple types of $N^{th}$ inorganic fibers, which are the same as and/or different than those used in any previous slurry, one or more $N^{th}$ organic binders, which are the same and/or different than the organic binders used in any previous slurry, and an $N^{th}$ neutral pH flocculent, which is the same as or a different flocculent than that used in any previous slurry or an $N^{th}-1$ slurry;
    forming (e.g., by a wet laid paper making process, molding process, etc.) an $N^{th}$ nonwoven fibrous material (e.g., in the form of a flat or curved sheet, a truncated cone, or any other desired two- or three-dimensional shape) from the $N^{th}$ slurry.
    wherein N is a whole number greater than or equal to 4, and the addition of the $N^{th}-1$ waste water in the $N^{th}$ slurry does not adversely affect the flocculation of the $N^{th}$ organic binder in the $N^{th}$ slurry.
    The $N^{th}-1$ waste water in the $N^{th}$ slurry can be seen as not adversely affecting the flocculation of the $N^{th}$ organic binder in the $N^{th}$ slurry, for example, when the $N^{th}$ slurry does not exhibit significant premature flocculation of the $N^{th}$ organic binder due to the use of the $N^{th}-1$ waste water in the $N^{th}$ slurry. Preferably, the use of the $N^{th}-1$ neutral pH flocculent causes the $N^{th}-1$ waste water to maintain a relatively neutral pH. It is believed that the neutral pH of the $N^{th}$ waste water is the result of only or mostly the $N^{th}$ neutral pH flocculent and that the preceding neutral pH flocculants used provide little or no help in maintaining the neutral pH of the $N^{th}$ waste water.

14. The method according to embodiment 13, wherein the $N^{th}$ slurry comprises a quantity of relatively clean water.

15. The method according to embodiment 13 or 14 further comprising:
    separating or otherwise removing a quantity of an $N^{th}$ waste water from the $N^{th}$ slurry (e.g., removed before, during, or after the forming of the $N^{th}$ nonwoven fibrous material or otherwise from the Nth slurry).

16. The method according to embodiment 15, wherein during the forming of the $N^{th}$ nonwoven fibrous material from the $N^{th}$ slurry, a quantity of the $N^{th}$ waste water is separated or otherwise removed from the $N^{th}$ slurry, while the $N^{th}$ inorganic fibers are formed into the $N^{th}$ nonwoven fibrous material.

17. The method according to any one of embodiments 13 to 16, wherein the $N^{th}$ neutral pH flocculent is the same as a previously use neutral pH flocculent (e.g., the $N^{th}-1$ neutral pH flocculent).

18. The method according to any one of embodiments 1 to 17, wherein the inorganic fibers in each slurry comprise at least one or more or any combination of glass fibers, inorganic biosoluble fibers, refractory ceramic fibers and other ceramic fibers.

19. The method according to any one of embodiments 1 to 18, wherein each slurry further comprises a quantity of intumescent material. Such intumescent materials can include, for example, at least one or more or any combination of unexpanded vermiculite, and graphite.

20. The method according to any one of embodiments 1 to 19, wherein at least one or more, or most, or all of the nonwoven fibrous materials used is or are an intumescent material.

21. The method according to any one of embodiments 1 to 20, wherein at least one or more, or most, or all of the nonwoven fibrous materials used comprise in the range of from about 15 percent, and in increments of about 1 percent, up to and including about 70 percent by weight of intumescent material, and any range therebetween (e.g., from about 20 percent up to and including about 60 percent).

22. The method according to any one of embodiments 1 to 21, wherein at least one or more, or most, or all of the nonwoven fibrous materials used is or are a non-intumescent material.

23. The method according to any one of embodiments 1 to 22, wherein at least one or more, or most, or all of the nonwoven fibrous materials used comprise in the range of from about 30 percent, and in increments of about 1 percent, up to and including at least about 85 percent by weight of the inorganic fibers (e.g., up to and including at least about 86, 87, 88, 89, 90, 91, 92, 93, 94, 95, 96, 97, 98 or 99 percent by weight, or more), although lower weight percentages may also be useful.

24. The method according to any one of embodiments 1 to 23, wherein the organic binder in at least one or more, or most, or all of the slurries used comprise at least one polymer having anionic groups (e.g., end groups and/or pendant side chain groups). For example, the organic binder can comprise one or more or any combination of acrylic polymers, vinyl polymers (e.g., copolymers of monomers comprising ethylene and vinyl acetate), polyurethanes, and silicone polymers having anionic groups (e.g., anionic end groups and/or pendant side chain groups). The organic binder polymer may also comprise a copolymer of monomers comprising one or more or any combination of ethylene and vinyl acetate.

25. The method according to any one of embodiments 1 to 24, wherein the organic binder in at least one or more, or most, or all of the slurries used is in the form of an aqueous anionically stabilized polymer emulsion (for example, a latex).

26. The method according to any one of embodiments 1 to 25, wherein the organic binder in at least one or more, or most, or all of the slurries used has a glass transition temperature in the range of from about −60° C., and in increments of 1° C., up to about 30° C., and any range therebetween (e.g., from −40° C. up to 10° C.

27. The method according to any one of embodiments 1 to 26, wherein the organic binder content of at least one or more, or most, or all of the nonwoven fibrous materials used is in the range of from about 0.5 percent, and in increments of about 0.5 percent, up to and including about 15 percent by weight, and any range therebetween (e.g., from about 0.5, 1.0, or 1.5 up to and including about 3, 4, 5, 6, 7, 8, 9, 10, 11, 12, 13, 14 or 15 percent by weight).

28. The method according to any one of embodiments 1 to 27, wherein at least one or more, or most, or all of the nonwoven fibrous materials used has a total organic component weight that is in the range of from about 0.5 percent, and in increments of about 0.5 percent, up to and including about 15 percent by weight, and any range therebetween (e.g., from about 0.5, 1.0, or 1.5 up to and including about 3, 4, 5, 6, 7, 8, 9, 10, 11, 12, 13, 14 or 15 percent by weight). This total organic component weight can be provided in part or completely by the organic binders used.

29. The method according to any one of embodiments 1 to 28, wherein at least one or more, or most, or all of the nonwoven fibrous materials used has a total organic component weight that is less than or equal to 9 percent of the total weight of its inorganic fibers or the total weight of the nonwoven fibrous material.

30. The method according to any one of embodiments 1 to 29, wherein at least one or more, or most, or all of the neutral pH flocculants used (in the form of the same or a different flocculent) comprises an organic polymer having cationic groups.

31. The method according to any one of embodiments 1 to 30, wherein at least one or more, or most, or all of the neutral pH flocculants used is present in its corresponding slurry in an amount of from at least about 1%, and in increments of 1%, up to and including about 100% by the weight of the organic binder polymer, and any range therebetween (e.g., at least about 5%, 10%, 15%, and 20%). It can be desirable for the weight percentage of the neutral pH flocculent in the fibrous material to be less than 20% on a dry weight basis.

32. The method according to any one of embodiments 1 to 31, wherein at least one or more, or most, or all of the organic binders used comprises an organic polymer that forms a reaction product with its corresponding neutral pH flocculent.

33. The method according to any one of embodiments 1 to 32, wherein at least one or more, or most, or all of the neutral pH flocculants used (e.g., in the form of the same or a different flocculent) comprises a metal cation (e.g., an aluminum cation).

34. The method according to embodiment 1 to 33, wherein at least one or more, or most, or all of the neutral pH flocculants used is selected from the group consisting of Flocculent 1 to Flocculent 30, and any combination thereof.

35. The method according to any one of embodiments 1 to 34, wherein at least one or more, or most, or all of the slurries used exhibits a pH in the range of from about 5.5, and in increments of about 0.1 (i.e., 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4), up to and including about 8.5, and any range therebetween. This embodiment exemplifies what is intended by use of the phrase "in increments of" when describing a specified range.

36. The method according to any one of embodiments 1 to 35, wherein at least one or more, or most, or all of the slurries containing waste water has a total water content comprising in the range of from at least about 10%, and in increments of about 1%, up to and including about 100% (e.g., at least about 10%, 15%, 20%, 25%, 30%, 35%, 40%, 45%, 50%, 55%, 60%, 65%, 70%, 75%, 80%, or more of the water used to make the slurry is waste water).

37. The method according to any one of embodiments 1 to 36, wherein the forming is a wet laid paper making process.

38. The method according to any one of embodiments 1 to 37, wherein at least one or more, or most, or each nonwoven fibrous material is in the form of a continuous flat or curved sheet or web. After being formed, it can be desirable for the sheet or web to be continuously converted into individual parts in line with the forming process, or first wound into a roll and then subsequently unwound and converted.

39. The method according to any one of embodiments 1 to 38, wherein the forming further comprises converting at least one or more, or most, or each nonwoven fibrous material into a plurality of nonwoven fibrous material structures, with each nonwoven fibrous material structure having a two-dimensional shape (e.g., being in the form of a mounting mat, C-shaped end cone insulator, or a notched donut-shaped end cone insulator).

40. The method according to any one of embodiments 1 to 36, wherein the forming is a slurry molding process.

41. The method according to any one of embodiments 1 to 36 and 40, wherein at least one or more, or most, or each nonwoven fibrous material is in the form of an individually molded nonwoven fibrous material structure, with each nonwoven fibrous material structure having a two-dimensional or three-dimensional shape. Any desired two- or three-dimensional shaped structure may be made including, e.g., a structure in the form of a two-dimensional mat or sheet (e.g., a tongue and groove mounting mat, flat circular part, etc.), one-piece three-dimensional truncated cone-shaped end cone insulator, multiple-piece truncated cone-shaped end cone insulator, a tubular shaped part (e.g., a tubular mounting mat).

42. The method according to any one of embodiments 1 to 41, wherein at least one or more, or most, or each nonwoven fibrous material is in the form of at least one or a plurality of mounting mats operatively adapted (i.e., dimensioned, composed, and/or configured) for use in mounting a pollution control element in the housing of a pollution control device.

43. The method according to any one of embodiments 1 to 41, wherein at least one or more, or most, or each nonwoven fibrous material is in the form of at least one or a plurality of end cone insulators or other insulators operatively adapted for use in a pollution control device.

44. The method according to any one of embodiments 1 to 41, wherein at least one or more, or most, or each nonwoven fibrous material is in the form of at least one or a plurality of fire stops.

45. The method according to any one of embodiments 1 to 44, wherein at least one, most or each nonwoven fibrous material, formed from a slurry comprising a neutral pH flocculent, exhibits a pH in the range of from about 5.5, and in increments of about 0.1 (i.e., 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4), up to and including about 8.5, and any range therebetween, when tested according to the Material pH Test.

Material pH Test

The Material pH Test involves cutting a 50 gram sample of a nonwoven fibrous material into 12 mm by 12 mm size pieces or smaller, placing the pieces into a 500 ml beaker containing 300 ml of clean water. The pieces are submerged under the water until saturated and kept in the water for at least one hour or until the majority of the water soluble slurry components on the inorganic fibers dissolve into the water. The pH of the water containing each sample is then tested by either using a pH meter or by dipping a pH indicator strip (e.g., like colorpHast®) in the water containing the soaked sample pieces. While it is still wet, the pH indicator strip is compared to the color code printed on the pH indicator strip container. This measured pH reading is the Material pH Test result for the sample nonwoven fibrous material.

46. The method according to any one of embodiments 1 to 45, wherein the method is a batch process, where each slurry is formed separately.

47. The method according to any one of embodiments 1 to 46, wherein the formulation of each slurry is based on the same formula. Even if based on the same formula, the composition of each slurry can still vary depending, for example, on the variability of the waste water composition and the amount of waste water used for each slurry.

48. The method according to any one of embodiments 1 to 47, wherein the formulation of each slurry is based on a different formula (i.e., the composition of each slurry is different.).

Nonwoven Fibrous Material Embodiment

49. A nonwoven fibrous material (e.g., in the form of a flat or curved sheet, a one- or multiple-piece truncated cone, or any other desired two- or three-dimensional shape) made according to the method of any one of embodiments 1 to 48.

50. A nonwoven fibrous material according to embodiment 49 exhibiting a pH in the range of from about 5.5 up to and including about 8.5, when tested according to the Material pH Test.

Pollution Control Device Embodiments

51. A pollution control device comprising a housing, a pollution control element disposed within the housing; and a nonwoven fibrous material according to embodiment 49 or 50, with the nonwoven fibrous material being disposed within our outside of the housing.

52. The pollution control device according to embodiment 51, wherein at least one or more, or most, or each nonwoven fibrous material is in the form of a mounting mat disposed within a gap between the housing and the pollution control element.

53. The pollution control device according to embodiment 51 or 52, wherein the housing comprises an inlet end cone region and an outlet end cone region, at least one or each end cone region comprises an inner end cone housing and an outer end cone housing, at least one or more, or most, or each nonwoven fibrous material is in the form of an end cone insulator disposed within a gap between the inner and outer end cone housings.

Firestop Embodiments

54. A firestop comprising the nonwoven fibrous material according to embodiment 49 or 50.

Slurry Embodiments

55. Any one of the slurries used in a method according to any one of embodiments 1 to 48.

56. A slurry for making nonwoven fibrous materials (such as, e.g., those suitable for use in a pollution control device or as a firestop), the slurry comprising:

a quantity of a first waste water removed from a first slurry comprising water such as, e.g., waste water, relatively clean water (e.g., regular residential or commercial tap water), one or multiple types of first inorganic fibers, one or more first organic binders, and a first neutral pH flocculent;

an optional quantity of relatively clean water (i.e., not waste water);

one or multiple types of second inorganic fibers, which are the same or different than those used in the first slurry;

one or more second organic binders, which are the same or different than those used in the first slurry; and an optional second neutral pH flocculent, which is the same or different than that used in the first slurry (e.g., in the form of the same or a different flocculent), wherein the first neutral pH flocculent causes the first waste water to maintain a relatively neutral pH. It is believed that the neutral pH of a waste water is effected by the use of a neutral pH flocculent. It is also believed that the first neutral pH flocculent may not help to maintain the neutral pH of the second waste water. The nonwoven fibrous materials can be, for example, in the form of a flat or curved sheet, a one- or multiple-piece truncated cone, or any other desired two- or three-dimensional shape. In addition, the nonwoven fibrous material can be operatively adapted so as to be suitable for use in a pollution control device (e.g., as a mounting mat, thermal insulation sheet or end cone insert, etc.), or as a firestop.

57. The slurry according to embodiment 55 or 56, wherein the inorganic fibers in each slurry comprise at least one or more or any combination of glass fibers, and ceramic fibers.

58. The slurry according to any one of embodiments 55 to 57, wherein each slurry further comprises a quantity of intumescent material. Such intumescent materials can include, for example, at least one or more or any combination of unexpanded vermiculite, and graphite.

59. The slurry according to any one of embodiments 55 to 58, wherein at least the first organic binder, or each of the first and second organic binders, comprises at least one polymer having anionic groups (e.g., end groups and/or pendant side chain groups). For example, the organic binder can comprise one or more or any combination of acrylic polymers, vinyl polymers (e.g., copolymers of monomers comprising ethylene and vinyl acetate), polyurethanes, and silicone polymers having anionic groups (e.g., anionic? end groups and/or pendant side chain groups). The organic binder polymer may also comprise a copolymer of monomers comprising one or more or any combination of ethylene and vinyl acetate 60. The slurry according to any one of embodiments 55 to 59, wherein the first organic binder, or each of the first and second organic binders, is in the form of an aqueous anionically stabilized polymer emulsion (for example, a latex).

61. The slurry according to any one of embodiments 55 to 60, wherein the first organic binder, or each of the first and second organic binders, can have a glass transition temperature, for example, in the range of from at least about −60° C., and in increments of 1° C., up to 30° C., and any range therebetween (e.g., from −40° C. up to 15° C. or up to 10° C.).

62. The slurry according to any one of embodiments 55 to 61, wherein at least the first neutral pH flocculent, or each of the first and second neutral pH flocculents, (in the form of the same or a different flocculent) comprises an organic polymer having cationic groups.

63. The slurry according to any one of embodiments 55 to 62, wherein at least the first neutral pH flocculent, or each of the first and second neutral pH flocculents, can be present in its corresponding slurry in an amount of from at least about 0.1%, and in increments of 0.1%, up to and including 15% by the dry weight of the solid components of the slurry (i.e., not the water), and any range therebetween (e.g., from about 0.5% up to about 10%).

64. The slurry according to any one of embodiments 55 to 63, wherein at least the first organic binder, or each of the first and second organic binders, comprises an organic polymer that forms a reaction product with its corresponding neutral pH flocculent.

65. The slurry according to any one of embodiments 55 to 64, wherein at least the first neutral pH flocculent, or each of the first and second neutral pH flocculents, (in the form of the same or a different flocculent) further comprises a metal cation (e.g., an aluminum cation).

66. The slurry according to any one of embodiments 55 to 65, wherein the flocculent is selected from the group consisting of Flocculent 1 to Flocculent 30, and any combination thereof.

67. The slurry according to any one of embodiments 55 to 66, wherein each slurry exhibits a pH in the range of from about 5.5, and in increments of about 0.1 (i.e., 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4), up to and including about 8.5, and any range therebetween.

68. The slurry according to any one of embodiments 55 to 67, wherein each slurry containing waste water has a total water content comprising in the range of from at least about 10%, and in increments of about 1%, up to and including about 100% (e.g., at least about 10%, 15%, 20%, 25%, 30%, 35%, 40%, 45%, 50%, 55%, 60%, 65%, 70%, 75%, 80%, or more of the water used to make the slurry is waste water).

69. The slurry according to any one of embodiments 55 to 68, further comprising a quantity of relatively clean water (i.e., not waste water).

70. The slurry according to any one of embodiments 55 to 69, further comprising a second neutral pH flocculent, which is the same or different than that used in the first slurry.

Nonwoven Fibrous Material Embodiment

71. A nonwoven fibrous material (e.g., in the form of a flat or curved sheet, a one- or multiple-piece truncated cone, or any other desired two- or three-dimensional shape) formed using the slurry according to any one of embodiments 55 to 70.

72. The nonwoven fibrous material according to embodiment 71 in the form of a flat or curved sheet, a one- or multiple-piece truncated cone, or any other desired two- or three-dimensional shape.

73. The nonwoven fibrous material according to embodiment 71 or 72 exhibits a pH in the range of from about 5.5 up to and including about 8.5, when tested according to the Material pH Test.

This invention may take on various modifications and alterations without departing from its spirit and scope. Accordingly, this invention is not limited to the above-described but is to be controlled by the limitations set forth in the following claims and any equivalents thereof. This invention may be suitably practiced in the absence of any element not specifically disclosed herein.

What is claimed is:

1. A method of making nonwoven fibrous materials suitable for use in a pollution control device or as a firestop, said method comprising:

providing a first slurry comprising water, first inorganic fibers, a first organic binder, and a first neutral pH flocculent, where the first slurry is used to form a first nonwoven fibrous material suitable for use in a pollution control device or as a firestop;

removing first waste water from the first slurry;

optionally forming a first nonwoven fibrous material from the first slurry;

providing a second slurry comprising a quantity of the first waste water, an optional quantity of relatively clean water, second inorganic fibers, a second organic binder, and a second flocculent that is the same and/or a different flocculent than that used in the first slurry; and forming a second nonwoven fibrous material from the second slurry, wherein the addition of the first waste water in the second slurry does not adversely affect the flocculation of the second organic binder in the second slurry, and the second nonwoven fibrous material is suitable for use in a pollution control device or as a firestop.

2. The method according to claim 1, wherein the second flocculent comprises a second neutral pH flocculent, which is the same as or a different flocculent than that used in the first slurry, and said method further comprises:

removing a quantity of a second waste water from the second slurry;

providing a third slurry comprising a quantity of the second waste water, an optional quantity of relatively clean water, third inorganic fibers, a third organic binder, and a third neutral pH flocculent; and forming a third nonwoven fibrous material from the third slurry, wherein the addition of the second waste water in the third slurry does not adversely affect the flocculation of the third organic binder in the third slurry, and the third nonwoven fibrous material is suitable for use in a pollution control device or as a firestop.

3. The method according to claim 1, wherein for each additional $N^{th}$ slurry, said method further comprises:

providing an $N^{th}$ slurry comprising a quantity of waste water removed from a previous slurry, an optional quantity of relatively clean water, $N^{th}$ inorganic fibers, an $N^{th}$ organic binder, and an $N^{th}$ neutral pH flocculent;

forming an $N^{th}$ nonwoven fibrous material from the $N^{th}$ slurry, wherein N is a whole number greater than or equal to 4, and the addition of the $N^{th}-1$ waste water in the $N^{th}$ slurry does not adversely affect the flocculation of the $N^{th}$ organic binder in the $N^{th}$ slurry, and the $N^{th}$ nonwoven fibrous material is suitable for use in a pollution control device or as a firestop.

4. The method according to claim 1, wherein the organic binder in at least one slurry comprises at least one polymer having anionic groups.

5. The method according to claim 1, wherein at least one neutral pH flocculent comprises an organic polymer having cationic groups.

6. The method according to claim 1, wherein at least one neutral pH flocculent comprises a metal cation.

7. The method according to claim 1, wherein at least one slurry exhibits a pH in the range of from about 5.5 up to and including about 8.5.

8. The method according to claim 1, wherein each slurry containing waste water has a total water content comprising in the range of from at least about 10%.

9. The method according to claim 1, wherein said forming is a slurry molding process.

10. The method according to claim 1, wherein each nonwoven fibrous material is in the form of an individually molded nonwoven fibrous material structure having a two-dimensional or three-dimensional shape.

11. The method according to claim 1, wherein at least one nonwoven fibrous material is in the form of (a) at least one mounting mat operatively adapted for use in mounting a pollution control element in a pollution control device, (b) at least one end cone insulator operatively adapted for use in insulating an end cone region of a pollution control device, (c) at least one fire stop.

12. A slurry for making nonwoven fibrous materials, said slurry comprising:

a quantity of a first waste water removed from a prior slurry comprising water, first inorganic fibers, a first organic binder, and a first neutral pH flocculent;

an optional quantity of relatively clean water that is commercially acceptable for use in the slurry and is not waste water;

second inorganic fibers;

a second organic binder; and an optional second neutral pH flocculent, wherein the amount of first neutral pH flocculent present in the prior slurry causes the first waste water to maintain a relatively neutral pH.

13. The slurry according to claim 12, wherein at least the first neutral pH flocculent comprises an organic polymer having cationic groups.

14. The slurry according to claim 12, wherein at least the first neutral pH flocculent further comprises a metal cation.

15. The slurry according to claim 12, wherein the flocculent is selected from the group consisting of Flocculent 1 to Flocculent 30, and any combination thereof.

16. The slurry according to claim 12, wherein each slurry exhibits a pH in the range of from about 5.5 up to and including about 8.5.

17. The slurry according to claim 12, further comprising:

a quantity of relatively clean water that is commercially acceptable for use in the slurry and is not waste water; and a second flocculent that is the same as, or a different flocculent than, that used in the prior slurry;

forming a second nonwoven fibrous material from the second slurry, wherein the addition of the first waste water in the does not adversely affect the flocculation of the second organic binder.

* * * * *